(12) United States Patent
Raczek et al.

(10) Patent No.: US 9,649,903 B2
(45) Date of Patent: May 16, 2017

(54) WEAPONS PLATFORM, MILITARY VEHICLE COMPRISING A WEAPONS PLATFORM AND METHOD FOR OPERATING A WEAPONS PLATFORM

(71) Applicant: KRAUSS-MAFFEI WEGMANN GMBH & CO. KG, Munich (DE)

(72) Inventors: Matthias Raczek, Kassel (DE); Matthias Czok, Kassel (DE); Roman Wiche, Kassel (DE); Volker Crede, Kassel (DE)

(73) Assignee: KRAUSS-MAFFEI WEGMANN GMBH & CO. KG, Munich (DE)

( * ) Notice: Subject to any disclaimer, the term of this patent is extended or adjusted under 35 U.S.C. 154(b) by 0 days.

(21) Appl. No.: 14/415,749

(22) PCT Filed: Jul. 15, 2013

(86) PCT No.: PCT/DE2013/100261
§ 371 (c)(1),
(2) Date: Jan. 20, 2015

(87) PCT Pub. No.: WO2014/012535
PCT Pub. Date: Jan. 23, 2014

(65) Prior Publication Data
US 2015/0174979 A1    Jun. 25, 2015

(30) Foreign Application Priority Data
Jul. 20, 2012   (DE) .................. 10 2012 106 626

(51) Int. Cl.
*F41A 23/34* (2006.01)
*B60G 11/26* (2006.01)
(Continued)

(52) U.S. Cl.
CPC .......... *B60G 11/265* (2013.01); *B60G 13/003* (2013.01); *F41A 23/28* (2013.01); *F41A 23/30* (2013.01); *F41A 23/34* (2013.01)

(58) Field of Classification Search
CPC ..... B60G 11/265; B60G 13/003; F41A 23/28; F41A 23/30; F41A 23/34
(Continued)

(56) References Cited

U.S. PATENT DOCUMENTS 2,339,226 A * 1/1944 Trotter .................... F41A 25/14
                                                   89/37.03
4,076,225 A    2/1978 Houghton
(Continued)

FOREIGN PATENT DOCUMENTS

DE    2 231 543    1/1974
DE    27 50 472    5/1978
(Continued)

OTHER PUBLICATIONS

PCT, International Search Report (including English translation), PCT/DE2013/100261 (Oct. 18, 2013).
(Continued)

*Primary Examiner* — John D Cooper
(74) *Attorney, Agent, or Firm* — Thompson Hine LLP

(57) ABSTRACT

A weapons platform including an undercarriage (11, 111) and a weapon (13, 113) that is positioned in a directable manner on the undercarriage (11, 111). The undercarriage (11, 111) may be supported in relation to the ground beneath by a supporting device (16, 116) that is damped in order to absorb firing recoil forces, the damping characteristics of the supporting device (16, 116) being adjustable in accordance with the firing recoil forces that are to be expected from the weapon (13, 113). The weapons platform (10, 110) may be
(Continued)

mounted on a military vehicle (1). A method for operating such a weapons platform (10, 110) is also disclosed.

20 Claims, 3 Drawing Sheets

(51) Int. Cl.
  *F41A 23/28* (2006.01)
  *F41A 23/30* (2006.01)
  *B60G 13/00* (2006.01)

(58) Field of Classification Search
  USPC .... 89/1.701, 1.702–1.706, 1.7, 37.01, 37.02, 89/37.13, 40.01–40.07, 40.11, 40.13, 89/42.01–42.03, 43.01, 44.01, 44.02, 46
  See application file for complete search history.

(56) References Cited

U.S. PATENT DOCUMENTS

| | | | |
|---|---|---|---|
| 4,391,180 A * | 7/1983 | Koine | F41A 25/16 |
| | | | 89/129.01 |
| 4,476,969 A * | 10/1984 | Dykema | F41A 25/10 |
| | | | 188/380 |
| 4,479,638 A | 10/1984 | Wolf et al. | |
| 4,485,722 A * | 12/1984 | Metz | F41A 25/20 |
| | | | 89/43.01 |
| 4,489,639 A | 12/1984 | Winkler et al. | |
| 5,558,384 A | 9/1996 | Mouterde et al. | |
| 5,829,556 A | 11/1998 | Domange | |
| 6,000,313 A | 12/1999 | Becker et al. | |
| 6,067,890 A | 5/2000 | Thiesen et al. | |
| 6,178,866 B1 | 1/2001 | Searle et al. | |
| 6,672,196 B1 | 1/2004 | Ang | |
| 7,111,544 B2 * | 9/2006 | Kohlstedt | F41A 23/26 |
| | | | 89/46 |
| 7,418,897 B2 | 9/2008 | Balbo | |
| 7,971,517 B2 | 7/2011 | Eagleston et al. | |
| 8,781,681 B2 | 7/2014 | Parison, Jr. et al. | |
| 8,839,708 B2 * | 9/2014 | Chiappini | F41A 9/82 |
| | | | 89/36.13 |
| 2002/0129696 A1 * | 9/2002 | Pek | F41A 23/34 |
| | | | 89/40.01 |
| 2004/0225567 A1 | 11/2004 | Mitchell et al. | |
| 2005/0156391 A1 | 7/2005 | Krenzin | |
| 2006/0225567 A1 | 10/2006 | Balbo | |
| 2009/0126558 A1 | 5/2009 | Kohnen | |
| 2011/0168007 A1 * | 7/2011 | Binek | F41A 25/18 |
| | | | 89/43.01 |

FOREIGN PATENT DOCUMENTS

| | | |
|---|---|---|
| DE | 31 21 963 | 12/1982 |
| DE | 31 30 830 | 2/1983 |
| DE | 31 35 855 | 3/1983 |
| DE | 0 473 790 | 3/1992 |
| DE | 42 27 954 | 2/1994 |
| DE | 44 03 196 | 8/1994 |
| DE | 44 26 607 | 2/1995 |
| DE | 691 19 515 | 11/1996 |
| DE | 196 08 455 | 9/1997 |
| DE | 197 13 192 | 10/1998 |
| DE | 197 16 198 | 10/1998 |
| DE | 695 08 106 | 8/1999 |
| DE | 3943508 C2 | 12/2000 |
| DE | 10 2004 039 973 | 3/2005 |
| DE | 10 2004 002 188 | 8/2005 |
| DE | 10 2006 014 155 | 9/2007 |
| DE | 10 2006 021 135 A1 | 11/2007 |
| DE | 10 2006 021 135 B4 | 2/2008 |
| DE | 60 2005 004 224 | 12/2008 |
| DE | 10 2008 062 093 B4 | 12/2010 |
| DE | 20 2011 103 707 | 11/2011 |
| DE | 10 2011 050 537 B3 | 10/2012 |
| EP | 1677065 A1 | 7/2006 |
| NO | WO 9301464 A1 * | 1/1993 ............. F41A 23/34 |
| WO | 01/51874 A2 | 7/2001 |
| WO | 03/025494 A1 | 3/2003 |
| WO | 2013/121022 | 8/2013 |

OTHER PUBLICATIONS

Military-Today.com: "T5-52", http://www.military-today.com/artillery/t5_52.htm (May 10, 2012) [retrieved from the internet on Sep. 10, 2013].

Biass, E.J. et al., "Self-Propelled Artillery Autoloading and 52 are the Trend," Armada International, Zurich, CH, vol. 27, No. 4, pp. 43-48 (Aug. 1, 2003).

DE 10 2011 050 537, published Oct. 2012, machine-generated English language abstract.

DE 10 2006 021 135, published Nov. 2007, machine-generated English language abstract.

DE 10 2008 062 093, published Dec. 2010, English language abstract from corresponding GB 2456036.

DE 3943508, published Dec. 2000, machine-generated English language abstract.

EP 1677065, published Jul. 2006, machine-generated English language abstract.

* cited by examiner

WEAPONS PLATFORM, MILITARY VEHICLE COMPRISING A WEAPONS PLATFORM AND METHOD FOR OPERATING A WEAPONS PLATFORM

TECHNICAL FIELD

The disclosure relates to weapons platforms and methods of operation thereof, and more particularly, to weapons platforms having an undercarriage and a weapon arranged in a directable manner with respect to the undercarriage, wherein the undercarriage can be supported with respect to the ground beneath by means of a supporting device. The disclosure also relates to military vehicles including such weapons platforms.

BACKGROUND

Weapons platforms usually have an undercarriage and a weapon that is arranged above the undercarriage and can be directed in terms of azimuth and elevation with respect to the undercarriage. In order to be able to bring such weapons platforms to a specific deployment location, it is known to form the weapons platforms either as a fixed component part of a military vehicle or as a kind of detachable piece of equipment, which is detachably received by a vehicle. When deployed, the weapons platforms can be operated from the vehicle, though weapons platforms that can be operated independently of a vehicle, for example as stationary weapons platforms for protecting field camps or similar objects, are also known.

When a shot is fired, firing reaction forces are produced, acting on the undercarriage of the weapons platform via the weapon. In order to be able to dissipate these sometimes considerable forces in a controlled manner, provided on the undercarriage are supporting devices, which support the undercarriage with respect to the ground beneath and provide controlled dissipation of the firing reaction forces into the ground beneath.

On account of the firing reaction forces that occur within a very short time interval and are introduced into the weapons platform in the manner of a shock wave, the supporting device has to meet particular requirements.

This is so because, with supporting devices of a rigid form, the shock-like firing reaction forces may cause situations in which the components lying in the flux of force of the firing reaction forces are unable to withstand the corresponding loads, so that they rupture, for example in the region of welded connections and similar weak points. For this reason, supporting devices of a damped design are also known in particular in the case of large-caliber weapons and weapons that to this extent produce considerable firing reaction forces, for instance from WO 03/025494 A1. For damping, such supporting devices have a number of damping springs, which are arranged between the undercarriage of the weapons platform and the ground beneath and by means of which the forces absorbed by the components can be limited to a maximum that lies below the destruction threshold of the corresponding components.

In addition to this there is the fact that the firing reaction forces can vary greatly in their direction and in their magnitude, which means that the supporting device has to meet further requirements.

For example, recoiling barreled weapons already differ from those weapons that are formed as non-recoiling launchers in the sign of the firing reaction forces that are produced during firing. This is so because, while the firing reaction forces in the case of recoiling barreled weapons, such as for example guns or howitzers, act counter to the firing direction of the barreled weapon in the manner of a recoil, firing reaction forces that are directed in the firing direction of the weapon occur in the case of launchers, such as for example rocket launchers. However, even in the case of weapons of the same type of construction, the firing reaction forces may differ greatly from shot to shot, since they are for example dependent on the directional position of the weapon in terms of azimuth and elevation, on the type of projectile used and on the amount of propulsive charge.

In the development of such weapons platforms, the damping of the supporting device is therefore usually designed for the greatest loading to be expected, for example for the firing of a shot in an unfavorable directional position with a maximum amount of propulsive charge. Although this is accompanied by the advantage that the weapons platform can absorb the maximum firing reaction force, it has been found to be disadvantageous that, in the case of such a design, the damping has in most cases been set as too hard, since the firing reaction forces are usually well below the expected maximum force, for example on account of the directional position of the weapon. In a way comparable to in the case of a rigid supporting device, a damping of the supporting device that is set as too hard may in these cases have the effect that the lifetime of the components lying in the flux of force of the firing reaction forces is adversely affected.

Against this background, the object of the invention is to provide a weapons platform, a vehicle and also a method for operating a weapons platform that are distinguished by a reduced adverse effect on the supporting device by the firing reaction forces that occur during firing.

In the case of a weapons platform of the type mentioned at the beginning, the object is achieved by it being possible for the damping characteristics of the supporting device to be set in dependence on the firing reaction forces of the weapon that are to be expected.

The adaptation of the damping characteristics of the supporting device to the firing reaction forces that are to be expected allows the mechanical loads on the components lying in the flux of force to be limited to a minimum. The damping is only set as hard when great firing reaction forces are to be expected. When expectations are below the maximum firing reaction force, the damping is set as softer, so that the components are mechanically affected less severely. A greater lifetime of the weapons platform can be achieved.

According to an advantageous design, the damping characteristics of the supporting device can be set in dependence on the magnitude of the firing reaction forces of the weapon that are to be expected. If a great firing reaction force in terms of magnitude is expected, the damping of the supporting device can be set altogether as harder than when smaller magnitudes of the firing reaction forces are expected. This allows the loading of the components lying in the flux of force to be reduced, and consequently the lifetime of the weapons platform to be increased.

It is also advantageous if the damping characteristics of the supporting device can be set in dependence on the direction of the firing reaction forces of the weapon that are to be expected. The damping of the supporting device can be set in such a way that it is at a maximum in the direction of the expected firing reaction forces. In this way, a directional adaptation of the damping to the firing reaction forces can take place, contributing to reduced loading of the components lying in the flux of force.

It is preferred if the damping characteristics of the supporting device can be set in dependence on the type of weapon. Depending on the type of weapon, the firing reaction forces to be expected may vary greatly, which may be particularly problematic whenever a weapons platform is to be operated optionally with one weapon or another. While the firing reaction forces for example in the case of recoiling barreled weapons act counter to the firing direction of the barreled weapon in the manner of a recoil, firing reaction forces that are directed more in the firing direction of the weapon occur in the case of non-recoiling launchers, in the manner of pulling forces. Therefore, in particular in the case of those weapons platforms that can be fitted with weapons of different types, it is possible by the adaptation of the damping characteristics of the supporting device to the type of weapon to achieve a long lifetime even after repeated changing of the weapon and the firing of many shots.

It has also proven to be advantageous if the damping characteristics of the supporting device can be set in dependence on the directional position of the weapon. The elevational or azimuthal directional position of the weapon gives rise to changes in the direction of effect of the firing reaction forces. The setting of the damping characteristics allows an adaptation of the damping to the directional position of the weapon to take place. It is preferred that the directional position of the weapon can be detected by sensors, so that the setting of the damping characteristics can take place in an automated manner on the basis of the directional position determined. The directional position may be detected by means of a detecting device, in particular a position sensor. It is particularly preferred that a position sensor for the elevational directional position and a position sensor for the azimuthal directional position are provided, so that elevation and azimuth can be detected separately.

A further advantageous design provides that the damping characteristics of the supporting device can be set in dependence on the type of munition introduced into the weapon. Differences in terms of magnitude of the firing reaction forces that arise as a result of the use of munition of different types can be compensated by setting the damping characteristics. The type of munition may be detected automatically by means of a detecting device arranged on the weapon or be entered manually by a user of the weapons platform.

It is also advantageous if the damping characteristics of the supporting device can be set in dependence on the propulsive charge introduced into the weapon. If different types of propulsive charge and/or different amounts of propulsive charge are used, changes of the firing reaction forces in terms of magnitude may arise. These changes can be compensated by the adaptation of the damping characteristics to the type of propulsive charge and/or amount of propulsive charge. The type of propulsive charge and/or amount of propulsive charge may be detected by means of a suitable detecting device on the weapon, so that the setting of the damping characteristics can take place on the basis of the type and/or amount of propulsive charge determined.

According to a further advantageous design, it is provided that the supporting device has a number of supports. The supports, which are supported on the ground beneath, allow the firing reaction forces to be introduced into the ground beneath in a controlled manner. The supports may be arranged on the undercarriage of the weapons platform, whereby secure standing of the undercarriage on the ground beneath is made possible. With preference, the supporting device has three supports, whereby even on uneven ground beneath secure standing can be achieved in the manner of a tripod.

It is advantageous if the supports are articulated by one of their ends on the undercarriage and the other end forms a supporting point. The pivotable articulation of the supports on the undercarriage allows the ends serving as supporting points to be pivoted out of their supporting position, in which they lie on the ground beneath, into a transporting position. Handling that is advantageous, by virtue of being easy, is obtained because it is not necessary to dismantle the supports for this.

With preference, the supports have a damping that can be set, so that the damping characteristics of the supporting device can be influenced by setting the damping of the supports.

It is also advantageous if the supports respectively have at least one damping element. The damping element allows the support also to perform a damping function in addition to its supporting function. It is preferred that the damping of the damping element can be set, so that the damping of the support can be influenced by way of the setting of the damping of the damping element. If a number of supports are provided on the weapons platform, a particularly advantageous design is obtained if the damping elements of the supports can be set independently of one another. This allows the setting of damping characteristics of the supporting device with which the firing reaction forces in different directions are damped to differing degrees.

For setting the damping of the damping element, the weapons platform may have a control device. The detected directional position of the weapon and/or the detected type of munition and/or the detected amount of propulsive charge may be fed to the control device, so that the setting of the damping of the damping elements can take place on the basis of the directional position detected and/or the type of munition detected and/or the amount of propulsive charge detected.

It is also advantageous if the supports respectively have a spring element. The spring element allows the damping displacement of the damping elements to be returned, i.e. after the introduction of force and the damping by the damping elements have taken place, these elements can be moved back into their starting position by means of the spring element. The required spring force may be produced by means of a mechanical spring or corresponding hydraulics.

Advantageous in terms of structural design is a weapons platform in which the damping element is formed as a hydraulic cylinder. This is so because hydraulic cylinders with damping that can be set can be obtained inexpensively as bought-in parts.

In the case of a military vehicle of the type mentioned at the beginning, the object is achieved by it being possible for the damping characteristics of the supporting device to be set in dependence on the firing reaction forces of the weapon that are to be expected.

The adaptation of the damping characteristics of the supporting device to the firing reaction forces that are to be expected allows the mechanical loads on the components lying in the flux of force to be limited to a minimum. The damping is only set as hard when great firing reaction forces are to be expected. When expectations are below the maximum firing reaction force, the damping is set as softer, so that the components are mechanically affected less severely. A greater lifetime of the weapons platform can be achieved.

It contributes to achieving the object in the case of a method of the type mentioned at the beginning if the damping characteristics of the supporting device are set in dependence on the firing reaction forces of the weapon that are to be expected.

The adaptation of the damping characteristics of the supporting device to the firing reaction forces that are to be expected allows the mechanical loads on the components lying in the flux of force to be limited to a minimum. The damping is only set as hard when great firing reaction forces are to be expected. When expectations are below the maximum firing reaction force, the damping is set as softer, so that the components are mechanically affected less severely. A greater lifetime of the weapons platform can be achieved.

According to an advantageous design of the method, the supporting device has a number of supports that can be set in their damping and respectively form supporting points of the weapons platform, the damping of the supports being set as all the softer the more the firing direction of the weapon is in line in terms of azimuth with the position of the respective supporting point. When a shot is fired from recoiling weapons, firing reaction forces that are directed counter to the firing direction of the weapon are produced, for which reason softer damping in the region in front of the weapon and correspondingly harder damping in the region behind the weapon allow advantageous dissipation of the firing reaction forces.

According to an alternative design, it is provided that the supporting device has a number of supports that can be set in their damping and respectively form supporting points of the weapons platform, the damping of the supports being set as all the harder the more the firing direction of the weapon is in line in terms of azimuth with the position of the respective supporting point. In the case of weapons with which firing reaction forces that are directed substantially in the firing direction occur, harder damping characteristics of the supporting device in the region of the firing direction allow advantageous dissipation of the firing reaction forces to take place.

It is also preferred if the damping characteristics of the supporting device are set as all the harder the greater the amount of propulsive charge that is introduced into the weapon. The firing reaction forces to be expected increase in terms of magnitude with an increasing amount of propulsive charge, for which reason a constant stability of the weapons platform can be made possible by correspondingly harder damping characteristics of the supporting device when there is an increasing amount of propulsive charge.

The designs described in connection with the weapons platform also may be used according to the invention with the vehicle and/or the method, on their own or in combination.

BRIEF DESCRIPTION OF THE DRAWINGS

Further details and advantages of the invention are to be explained below on the basis of several exemplary embodiments that are represented in the drawings, in which.

DETAILED DESCRIPTION

Figure 1:
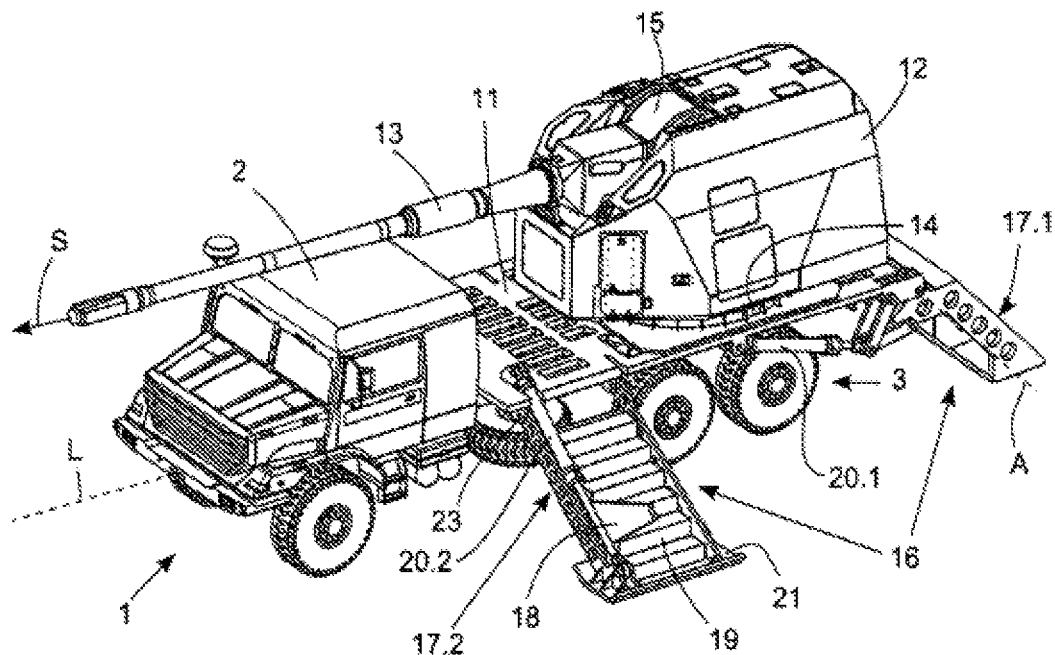
FIG. 1 shows a military vehicle comprising a weapons platform according to a first embodiment in a perspective view.

In FIG. 1, a military vehicle 1 formed as an off-road wheeled vehicle comprising a driver's cab 2 for receiving the vehicle crew is depicted. The driver's cab 2 may be of an armored form, so that the members of the crew located within the driver's cab 2 are protected from the effect of projectiles or mines and similar military threats.

The vehicle 1 also has a chassis 3 and also a weapons platform 10, arranged in the region above the chassis 3 and comprising a recoiling barreled weapon 13 formed as an artillery gun, the details of which are discussed more specifically below. The artillery gun represented in the exemplary embodiment is a lightweight gun. During the firing of a shot, the weapon 13 must be supported to dissipate the firing reaction forces occurring, since the firing reaction forces occurring cannot be absorbed by the chassis 3 alone.

The weapons platform 10 consists of a platform-like undercarriage 11, which is connected to the vehicle 1 and has a substantially rectangular outline, and also a turret 12, which is mounted rotatably with respect to the undercarriage 11 and is arranged above the undercarriage 11. The turret 12 is received in a rotary bearing 14, by means of which the turret 12 can be directed in the azimuthal direction. In the turret 12, the weapon 13 is mounted by means of a further rotary bearing 15 in a directable manner in terms of elevation. The weapon 13 can be directed in terms of azimuth and elevation in the rotary bearings 14 and 15 by means of directional drives that are not represented in the figures. To this extent, the turret 12 and the undercarriage 11 form a turret mount.

Figure 2:
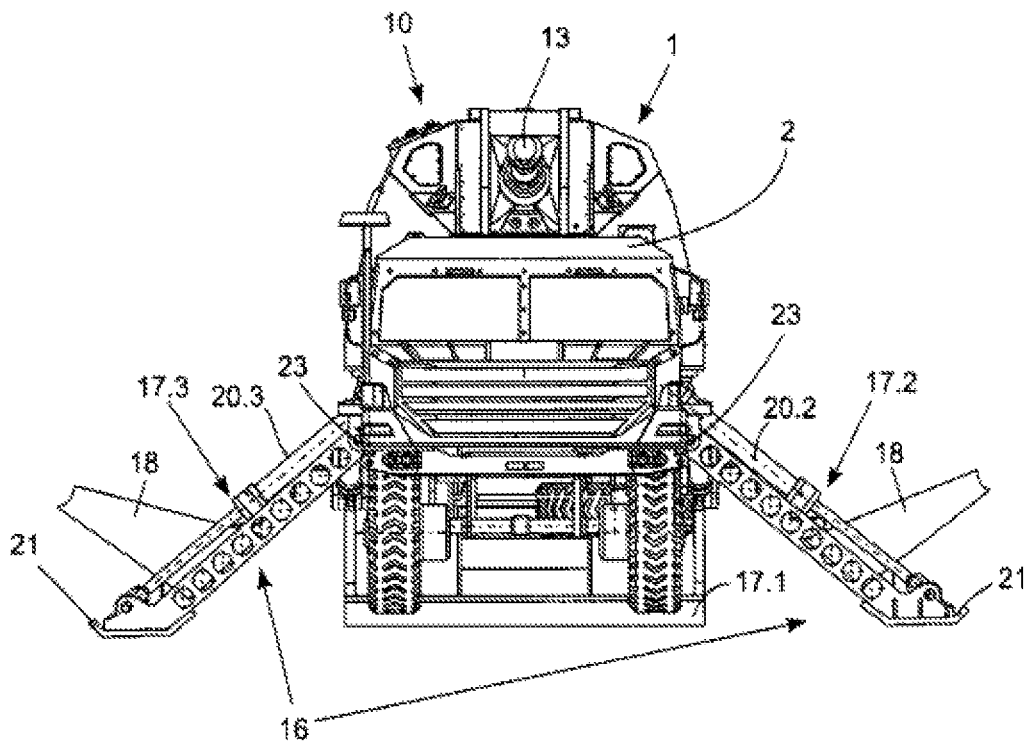
FIG. 2 shows the vehicle from FIG. 1 in a front elevational view.

For supporting the weapons platform 10, arranged on the undercarriage 11 is a supporting device 16, which in the exemplary embodiments has altogether three supports 17.1-17.3, cf. FIGS. 1 and 2.

To avoid excessive component loads when a shot is fired from the weapon 13, the supporting device 16 is of a damped form. The supporting device 16 is in this case designed in such a way that its damping characteristics can be set in dependence on the firing reaction forces that are to be expected. This adaptation of the damping characteristics of the supporting device 16 to the firing reaction forces that are to be expected results in greatly reduced loading of the components lying in the flux of force of the firing reaction forces in comparison with unchangeable damping, and consequently results in a greater lifetime of the weapons platform 10.

Details of this damped supporting device 16 are to be explained below.

A first support 17.1 is arranged on a side of the undercarriage 11 that is arranged in the rear region of the vehicle 1. The support 17.1 is articulated by one end in a pivotally movable manner on the undercarriage 11 and can be pivoted about a pivot axis A, which is arranged transversely in relation to a vehicle longitudinal axis L of the vehicle 1. For transferring the support 17.1 from a pivoted-up position into the supporting position represented in FIGS. 1-3, the support 17.1 has a drive, which is formed as a hydraulic cylinder 20.1 and also forms a damping element for the damping of the support 17.1. To this extent, the hydraulic cylinder 20.1 has a dual function.

The rear support 17.1 may be formed in the manner of a closing element, which in the pivoted-up closing position forms a rear closure of a closable opening of the turret 12 mounted rotatably with respect to the undercarriage 11. A corresponding closing element is described in the German patent application 10 2011 050 537.

The supporting device 16 also has two supports 17.2 and 17.3, which are arranged on the longitudinal sides of the weapons platform 10, are arranged mirror-symmetrically in relation to one another and are articulated by one end in a pivotally movable manner on the undercarriage 11 of the weapons platform 10 by means of pivot bearings 23. The supports 17.2 and 17.3 are mounted in a pivotally movable manner in the region of two opposite sides of the weapons platform 10. With respect to the vehicle 1, the supports 17.2, 17.3 are articulated in the region of the longitudinal sides of the vehicle 1. For the damping of the supports 17.2, 17.3 and also for the transfer of the supports 17.2, 17.3 from their pivoted-up position into the supporting position represented in FIGS. 1 and 2, serving for supporting the weapons platform 10, on the supports 17.2, 17.3 there is a hydraulic cylinder 20.2, 20.3 respectively arranged as a drive and also as a damping element.

If the weapons platform 10 is to be transported, the supports 17.2 and 17.3 can be pivoted up. In the pivoted-up position, the supports 17.2, 17.3 form a lashing for the weapon 13. For this reason, arranged on the supports 17 are lashing jaws 18, which in the pivoted-up position reach around the weapon 13 in the manner of a gripper and in this way fix it, for example for transportation.

The hydraulic cylinders 20.1-20.3 of the three supports 17.1-17.3 are articulated by their one end in a pivotally movable manner on the undercarriage 11 of the weapons platform 10 and by their opposite end in a pivotally movable manner on the respective support 17.1-17.3 of the supporting device 16. The damping elements 20.1-20.3 are arranged in different alignments on the weapons platform 10, so that different damping elements 20.1-20.3 can absorb differently directed components of the firing reaction forces. The damping of the damping elements 20.1-20.3 can in this case be set independently of one another. For setting the damping of the individual damping elements 20.1-20.3 of the supporting device 16, a control device that is not represented in the figures is provided, and may be arranged on the weapons platform 10 or on the vehicle 1. The type of weapon 13 arranged on the weapons platform 10, the type of munition introduced into the weapon 13, the amount of propulsive charge introduced into the weapon 13 and also the directional position of the weapon 13 in terms of azimuth and elevation are fed to the control unit as input variables.

The input variables may be entered manually by an operator of the weapon 13 or be detected automatically by detecting devices that are likewise not represented in the figures. The directional position of the weapon 13 may take place for example by position sensors, which for the azimuthal directional position are arranged in the region of the rotary bearing 14 and for the elevational directional position are arranged in the region of the rotary bearing 15.

Figure 4:
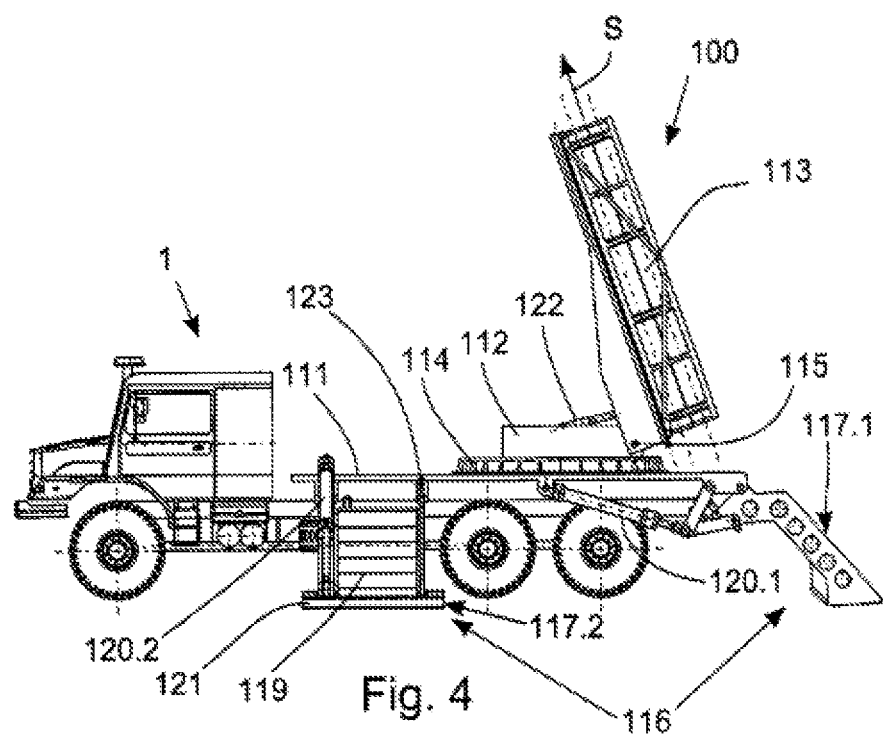
FIG. 4 shows a military vehicle comprising a weapons platform according to a second embodiment in a side elevational view.

In FIG. 4, a second design of a weapons platform 110 according to the invention is represented. The weapons platform 110 substantially differs from the weapons platform 10 according to the first exemplary embodiment by the weapon 113 arranged on the weapons platform 110. In order to avoid repetition, only the differences in comparison with the weapons platform 10 already described above are to be discussed below, reference numerals with the same two end digits referring to elements of the two designs that are the same or act in the same way.

By contrast with the weapons platform 10, the weapons platform 110 has a non-recoiling weapon 113, which is formed as a multiple rocket launcher 113. The multiple rocket launcher 113 is arranged such that it can be directed in terms of elevation on a base 112 by means of a rotary bearing 115. For directing the weapon 113 in terms of elevation, an elevational directional drive 122 is provided, formed as a linear drive arranged between the base 112 and the weapon 113. The base 112 is rotatably connected to the undercarriage 111 of the weapons platform 110 by means of a rotary bearing 114, so that the weapon 113 can be directed in terms of azimuth with respect to the undercarriage 11 by turning of the base 112.

The supporting device 116 only differs in structural design from the supporting device 16 according to the first exemplary embodiment in that the supporting device 116 does not have any lashing jaws. With regard to the damping characteristics of the supporting devices 16 and 116, however, some differences arise. Since different firing reaction forces are to be expected in the case of the two weapons platforms 10 and 110 on account of the different type of weapons 13 and 113 that are arranged on the weapons platforms 10 and 110 according to the two exemplary embodiments, the damping characteristics of the supporting device 16 according to the first exemplary embodiment are set differently than the damping characteristics of the supporting device 116 according to the second exemplary embodiment. In this way, an adaptation of the damping characteristics to the respective weapon 13, 113 can take place.

The adaptation of the damping characteristics of the supporting device 16, 116 is to be explained below in conjunction with the method according to the invention for operating a weapons platform 10, 110 on the basis of several cases of examples.

Figure 3:
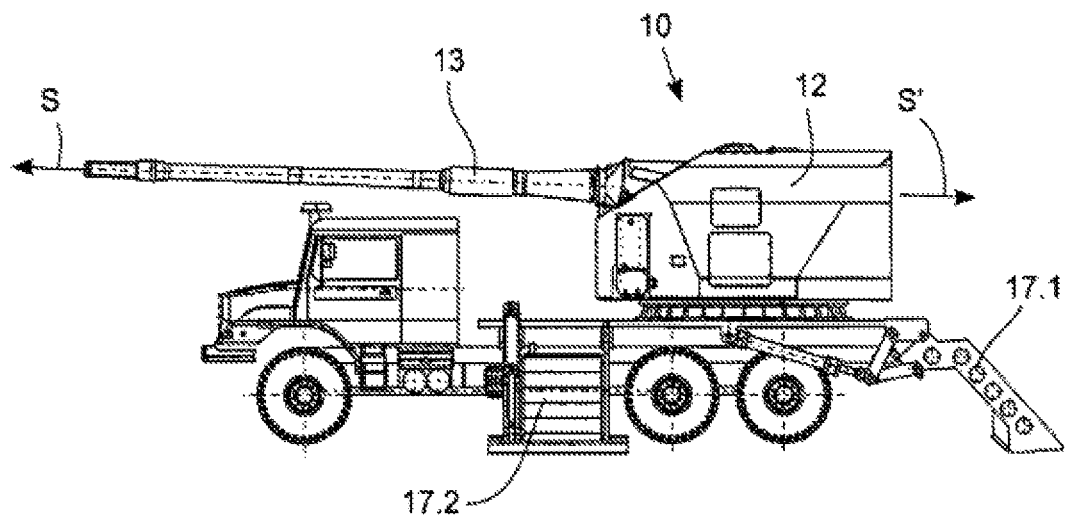
FIG. 3 shows the vehicle from FIG. 1 in a side elevational view.

The weapons platform 10 according to the first exemplary embodiment has a recoiling weapon 13, for which reason firing reaction forces that are directed substantially counter to the firing direction S of the weapon 13 are to be expected, cf. FIG. 3. On the other hand, the weapon 113 according to the second exemplary embodiment is a low-recoiling weapon, with which the firing reaction forces act in particular in the firing direction S, cf. FIG. 4.

Figure 5:
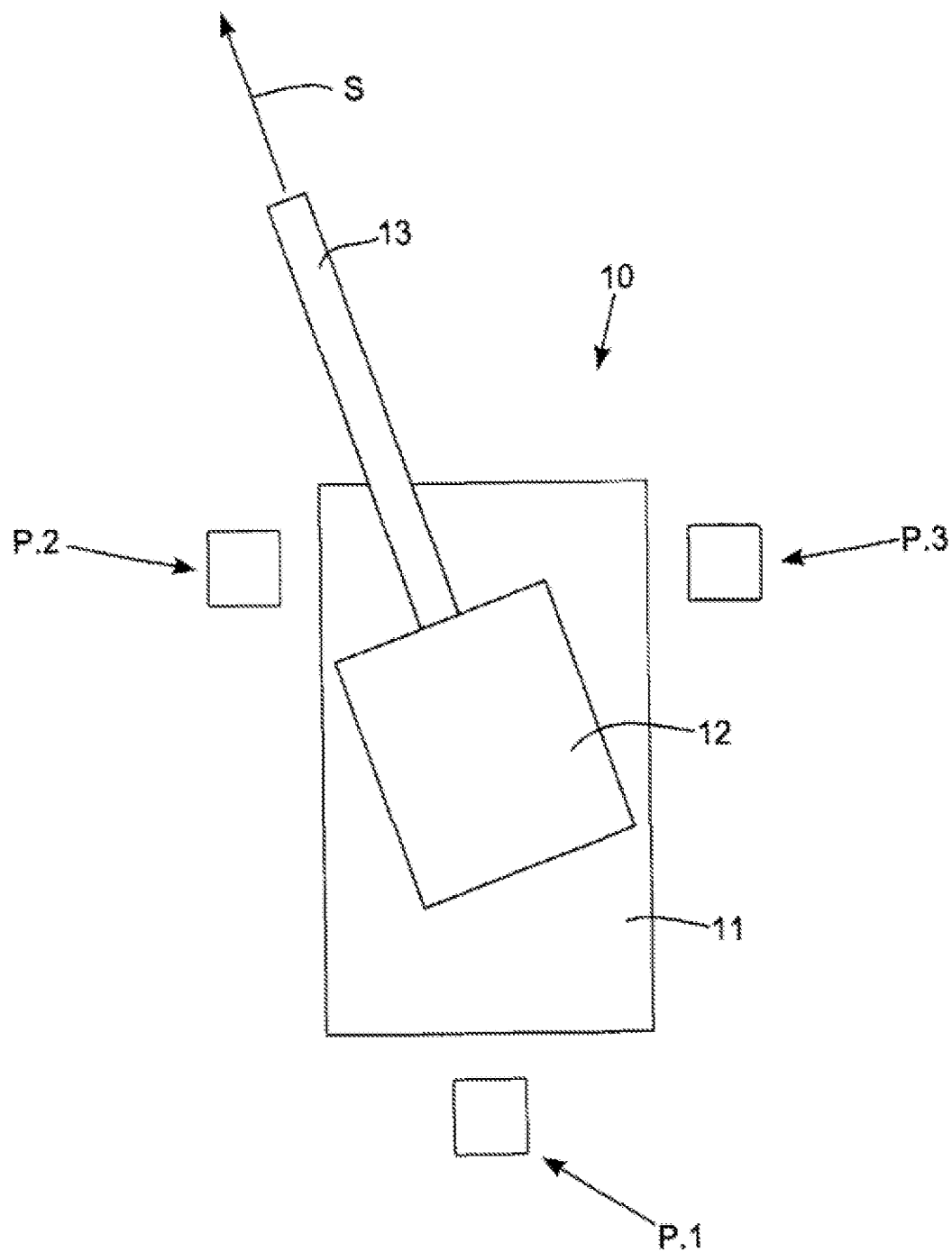
FIG. 5 shows a top plan view of a vehicle according to the first embodiment in a schematic representation.

To improve the stability of the weapons platforms 10 and 110 when a shot is fired, the damping characteristics of the weapons platform 10 comprising the recoiling weapon 13 are thus set in such a way that the damping of the damping elements 20.1-20.3 is set as all the harder the more a direction S' counter to the firing direction S of the weapon 13 coincides with the alignment of the respective damping element 20.1-20.3. Since the firing reaction forces act substantially in this direction S', harder damping in the region behind the weapon 13 can bring about an improvement in the stability of the weapons platform 10 when a shot is fired. This is to be explained on the basis of the representation in FIG. 5, in which the position of the individual supporting points P.1-P.3 of the supports 17.1-17.3 with respect to the weapons platform 10 is schematically represented. If the weapon 13 is in the directional position shown in FIG. 5, a maximum of the firing reaction forces occurs behind the weapon 13, that is to say in the region of the supporting point P.1. Therefore, the damping of the support 17.1, which is supported by its free end at the supporting point P.1, is set as harder than the damping of the other two supports 17.2 and 17.3, which lie on the ground beneath at the supporting points P.2 and P.3.

In the case of the supporting device 116 of the weapons platform 110 according to the exemplary embodiment represented in FIG. 4, precisely the opposite procedure is followed. In the case of this weapons platform 110, equipped with a rocket launcher 113, the damping of a damping element 120.1, 120.2 is set as all the harder the more the firing direction S of the weapon 113 coincides with the alignment of the respective damping element 120.1, 120.2. When a shot is fired, a pulling effect in the firing direction S is produced by the rocket emerging from the rocket launcher 113, so that harder damping of the damping elements 120.1, 120.2 is set in the region in front of the weapon 113. The damping element of the support 117.1, arranged behind the weapon 113, can be set as softer.

Generally, the firing reaction forces to be expected are also dependent on the amount of propulsive charge introduced into the weapon. This is so because the amount of propulsive charge determines the magnitude of the firing reaction force to be expected. It is therefore of advantage if the damping characteristics of the supporting device 16, 116 are set as all the harder the greater the amount of propulsive charge that is introduced into the weapon 13, 113. A greater firing reaction force, caused by a greater amount of propulsive charge, can consequently be countered by a harder-set supporting device 16, 116.

The vehicles 1 and weapons platforms 10, 110 described above and also the corresponding method for the operation thereof are distinguished by the fact that the damping characteristics of the supporting device 16, 116 can be set in dependence on the firing reaction forces of the respective weapon 13, 113 that are to be expected. This allows the loading of the components lying in the flux of force of the firing reaction forces to be reduced and the lifetime of the weapons platform 10, 110 to be increased.

REFERENCE NUMERALS

1 Vehicle
2 Driver's cab
3 Chassis
10 Weapons platform
11 Undercarriage
12 Turret
13 Weapon
14 Rotary bearing
15 Rotary bearing
16 Supporting device
17.1-17.3 Support
18 Lashing jaw
19 Steps
20.1-20.3 Hydraulic cylinder
21 Supporting foot
23 Pivot bearing
110 Weapons platform
111 Undercarriage
112 Base
113 Weapon
114 Rotary bearing
115 Rotary bearing
116 Supporting device
117.1-117.3 Support
119 Steps
120.1,120.2 Hydraulic cylinder
121 Supporting foot
123 Pivot bearing
A Pivot axis
L Vehicle longitudinal axis
S Firing direction
S' Direction

The invention claimed is:

1. A weapons platform comprising an undercarriage (11, 111) and a weapon (13, 113) arranged in a directable manner with respect to the undercarriage (11, 111), wherein the undercarriage (11, 111) is supported with respect to the ground beneath by means of a supporting device (16, 116) of a damped design for absorbing firing reaction forces of the weapon, characterized in that damping characteristics of the supporting device (16, 116) are adjustable in dependence on the firing reaction forces of the weapon (13, 113) that are to be expected; the supporting device including a plurality of supports, a selected one of the plurality of supports having a damping set relatively harder than at least one other of the plurality of supports in a first region in which relatively higher firing reaction forces are expected from the weapon.

2. The weapons platform as claimed in claim 1, wherein the damping characteristics of the supporting device (16, 116) are set in dependence on a directional position of the weapon (13, 113) relative to the undercarriage.

3. The weapons platform as claimed in claim 1, wherein the damping characteristics of the supporting device (16, 116) are set in dependence on a type of weapon (13, 113).

4. The weapons platform as claimed in claim 1, wherein the plurality of supports includes a first support, a second support, and a third support, and wherein the damping characteristics of the first support, the second support, and the third support are set such that softer damping is in a region in front of the weapon and correspondingly harder damping is in a region behind the weapon.

5. The weapons platform as claimed in claim 1, wherein the damping characteristics of the supporting device (16, 116) are set in dependence on a type of munition introduced into the weapon (13, 113).

6. The weapons platform as claimed in claim 1, wherein the damping characteristics of the supporting device (16) are set in dependence on a propulsive charge introduced into the weapon (13).

7. The weapons platform as claimed in claim 1, wherein the plurality of supports of the supporting device (16, 116) includes at least three supports.

8. The weapons platform as claimed in claim 7, wherein each of the supports (17.1-17.3, 117.1-117.2) is pivotally mounted at one of its ends on the undercarriage (11, 111), and an opposite end of the support forms a supporting point.

9. The weapons platform as claimed in claim 7, wherein each of the supports (17.1-17.3, 117.1-117.2) has a damping that can be set.

10. The weapons platform as claimed in claim 7, wherein each of the supports (17.1-17.3, 117.1-117.2) has at least one damping element (20.1-20.3, 120.1,120.2).

11. A military vehicle comprising a weapons platform (10, 110) that includes an undercarriage (11, 111) and a weapon (13, 113) arranged in a directable manner with respect to the undercarriage (11, 111), wherein the undercarriage (11, 111) is supported with respect to ground beneath the vehicle by means of a supporting device (16, 116) of a damped design for absorbing firing reaction forces of the weapon, characterized in that damping characteristics of the supporting device (16, 116) are set in dependence on the firing reaction forces of the weapon (13, 113) that are to be expected; the supporting device including a plurality of supports, a selected one of the plurality of supports having a damping set relatively harder than at least one other of the plurality of supports in a first region in which relatively higher firing reaction forces are expected from the weapon.

12. A method for operating a weapons platform (10, 110) including an undercarriage (11, 111) and a weapon (13, 113) arranged in a directable manner with respect to the undercarriage (11, 111), wherein the undercarriage (11, 111) is supported with respect to ground beneath the undercarriage by means of a supporting device (16, 116) of a damped design for absorbing firing reaction forces, the method comprising setting damping characteristics of a plurality of supports of the supporting device (16, 116) in dependence on firing reaction forces of the weapon (13, 113) that are to be expected by setting a damping of a selected one of the plurality of supports relatively harder than at least one other of the plurality of supports in a first region in which relatively higher firing reaction forces are expected from the weapon.

13. The method for operating a weapons platform as claimed in claim 12, wherein setting the damping characteristics includes setting damping of each of the plurality of supports and respectively forming supporting points of the weapons platform (10), such that the damping of the number of supports (17.1-17.3) is set as softer as a firing direction (S) of the weapon (13) aligns in terms of azimuth with a position of a respective one of the plurality of supporting points.

14. The method for operating a weapons platform as claimed in claim 12, wherein setting the damping characteristics includes setting a damping of each of the plurality of supports and respectively form supporting points of the weapons platform (110), such that the damping of the number of supports (117.1-117.2) is set as harder as a firing direction (S) of the weapon (113) aligns in terms of azimuth with a position of a respective one of the supporting points.

15. The method for operating a weapons platform as claimed in claim 12, characterized in that the damping characteristics of the supporting device (16, 116) are set as harder as a greater the amount of propulsive charge is introduced into the weapon (13, 113).

16. A weapons platform (10, 110) comprising:
an undercarriage (11, 111);
a weapon (13, 113) rotatably mounted on the undercarriage (11, 111);
a supporting device (16, 116) supporting the undercarriage (11, 111) with respect to the ground, the supporting device having a damped design for absorbing firing reaction forces, such that damping characteristics of the supporting device (16, 116) are set in dependence on expected firing reaction forces of the weapon (13, 113);

the supporting device including a plurality of supports, a selected one of the plurality of supports having a damping set relatively harder than at least one other of the plurality of supports in a first region in which relatively higher firing reaction forces are expected from the weapon.

17. The weapons platform as claimed in claim 16, further comprising a turret (12) mounted rotatably on the undercarriage (11); and the weapon (13) is mounted in the turret for movement in an azimuth direction and an elevational direction.

18. The weapons platform as claimed in claim 16, wherein each of the plurality of supports (17.1-17.3, 117.1-117.2) is pivotally attached to the undercarriage (11, 111) and includes a hydraulic cylinder (20.1-20.3, 120.1-120.2) for pivoting the plurality of supports to a pivoted-up position and to a supporting position, each of the hydraulic cylinders forming a damping element for damping the supports, the damping elements arranged in different alignments on the weapons platform (10, 110) so that different ones of the hydraulic cylinders absorb differently directed components of firing reaction forces of the weapon (13, 113); and wherein a damping of each of the hydraulic cylinders (20.1-20.3, 120.1-120.2) is set independently of a damping of the other hydraulic cylinders.

19. The weapons platform as claimed in claim 18, wherein the damping of each of the hydraulic cylinders (20.1-20.3, 120.1-120.2) is adjustable independently of the others, such that the damping of a selected one of the hydraulic cylinders is set as hard relative to others of the hydraulic cylinders when great firing reaction forces from the weapon (13, 113) are expected, and the damping of the selected one of the hydraulic cylinders is set as softer relative to others of the hydraulic cylinders in a region in which a firing reaction force of the weapon is below a maximum firing reaction force of the weapon.

20. The weapons platform as claimed in claim 19, wherein the damping of each of the hydraulic cylinders (20.1-20.3, 120.1-120.2) is set according to one or more of a type of munition introduced into the weapon (13, 113), an amount of propulsive charge introduced into the weapon, and a directional position of the weapon in terms of azimuth and elevation.

* * * * *